(12) United States Patent
Wang et al.

(10) Patent No.: US 11,970,232 B2
(45) Date of Patent: Apr. 30, 2024

(54) CLAMPING DEVICE FOR BICYCLE RACK

(71) Applicant: KING RACK INDUSTRIAL CO., LTD., Taichung (TW)

(72) Inventors: Chiu Kuei Wang, Taichung (TW); Hugues Espesset, Saint Juery (FR)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/084,576

(22) Filed: Dec. 20, 2022

(65) Prior Publication Data
US 2023/0271659 A1     Aug. 31, 2023

(30) Foreign Application Priority Data

Feb. 25, 2022 (TW) ................................ 111201955

(51) Int. Cl.
*B62H 3/02*      (2006.01)
*F16B 2/10*      (2006.01)

(52) U.S. Cl.
CPC ................ *B62H 3/02* (2013.01); *F16B 2/10* (2013.01)

(58) Field of Classification Search
CPC ... B60R 9/048; B60R 9/06; B60R 9/10; F16B 2/10; B62H 3/00; B62H 3/02; B62H 3/04; B62H 3/10; B62H 2003/005
See application file for complete search history.

(56) References Cited

U.S. PATENT DOCUMENTS

| | | | | |
|---|---|---|---|---|
| 5,385,280 A * | 1/1995 | Littlepage | ................. | B60R 9/06 224/570 |
| 5,509,776 A * | 4/1996 | Specht | ................... | B60R 9/042 224/924 |
| 5,820,002 A * | 10/1998 | Allen | ........................ | B60R 9/10 224/310 |
| 6,602,015 B1 * | 8/2003 | Evans | ................... | F16B 45/027 403/109.5 |
| 6,732,893 B2 * | 5/2004 | Morris | ...................... | B60R 9/10 224/558 |
| 7,712,614 B2 * | 5/2010 | Carlson | ................ | F16M 11/242 248/176.1 |

(Continued)

FOREIGN PATENT DOCUMENTS

| | | | | |
|---|---|---|---|---|
| DE | 202016102961 U1 * | 9/2016 | ............... | B25H 3/00 |
| EP | 3939836 A1 * | 1/2022 | ............... | B60R 9/06 |

(Continued)

*Primary Examiner* — Patrick D Hawn
(74) *Attorney, Agent, or Firm* — Che-Yang Chen; Law Office of Michael Chen

(57) ABSTRACT

A clamping device for a bicycle rack includes a first clamp and a second clamp respective formed to two ends of a shaft. The first clamp is secured to an upright frame of a bicycle rack, and the second clamp clamps a bicycle top tube or seat tube. The first clamp is a C-shaped clamp and includes a first part and a second part which is pivotably connected to the first part. A restraining hole is formed when the first part is pivoted toward second part. A locking member is pivotably connected to the second part and has a protrusion. The first part has a notch. When the locking member is pivoted to engage the protrusion with the notch, the first part is restricted from being pivoted away from the second part so as to securely restrain the upright frame of the bicycle rack in the restraining hole.

3 Claims, 8 Drawing Sheets

(56) References Cited

U.S. PATENT DOCUMENTS

| | | | | |
|---|---|---|---|---|
| 7,866,517 B2 * | 1/2011 | Pedrini | | B60R 9/06 224/532 |
| 8,038,106 B2 * | 10/2011 | Magno, Jr. | | H02G 3/32 248/65 |
| 8,210,407 B2 * | 7/2012 | Sautter | | B60R 9/048 224/924 |
| 8,342,575 B2 * | 1/2013 | Coleman | | F16B 2/185 24/298 |
| 8,348,113 B2 * | 1/2013 | Huang | | B60R 9/10 224/567 |
| 8,393,506 B2 * | 3/2013 | Malm | | B60R 9/10 224/558 |
| 9,688,209 B2 * | 6/2017 | Cha | | B60R 9/048 |
| 10,166,931 B2 * | 1/2019 | Dickinson | | B60R 9/10 |
| 10,174,773 B2 * | 1/2019 | Wang | | B62H 3/02 |
| 10,967,805 B2 * | 4/2021 | Wang | | B60R 9/10 |
| 11,148,604 B2 * | 10/2021 | Wang | | B60R 9/045 |
| 11,708,121 B2 * | 7/2023 | Wang | | B62K 3/06 280/7.1 |
| 2004/0256430 A1 * | 12/2004 | Wang | | B60R 9/10 224/520 |
| 2005/0284905 A1 * | 12/2005 | Naslund | | B60R 9/048 224/924 |
| 2006/0249466 A1 * | 11/2006 | Wang | | B62H 3/02 211/17 |
| 2015/0115011 A1 * | 4/2015 | Wang | | B60R 9/048 224/568 |
| 2022/0349433 A1 * | 11/2022 | Wang | | B60R 9/10 |

FOREIGN PATENT DOCUMENTS

| | | | | |
|---|---|---|---|---|
| GB | 2462868 A | * | 2/2010 | B60D 1/065 |
| WO | WO-2019116402 A1 | * | 6/2019 | B60R 9/10 |
| WO | WO-2023189450 A1 | * | 10/2023 | |

* cited by examiner

CLAMPING DEVICE FOR BICYCLE RACK

BACKGROUND OF THE INVENTION

1. Fields of the Invention

The present invention relates to a clamping device for a bicycle rack, and more particularly, to a clamping device for a bicycle rack without use of bolts.

2. Descriptions of Related Art

One of the conventional bicycle racks is attached to the rear end of a vehicle, wherein the two wheels of a bicycle are positioned on two trays of the bicycle rack. A clamping device includes a first clamp that is secured to an upright frame of the bicycle rack, and a second clamp that holds the top tube or the seat tube of the bicycle to secure the bicycle.

Most of the first clamp of the clamping devices of the current bicycle racks includes a U-shaped clamp with an adjustable bolt. When loosening the adjustment bolt, the clamp device is able to be opened to position the upright frame of the bicycle rack in the first clamp of the clamp device. The adjustable bolt is then tightened to secure the first clamp to the upright frame of the bicycle rack.

That is to say, the adjustable bolt needs to be loosened and then tightened to release or secure the upright frame of the bicycle rack. Besides, the size of the opening if the U-shaped clamp needs to be made according to different types of bicycles, so that the manufacturers have to prepare a considerable number of molds or parts thereby increasing the cost of the products.

The present invention intends to provide a clamping device for a bicycle rack to eliminate the shortcomings mentioned above.

SUMMARY OF THE INVENTION

The present invention relates to a clamping device for a bicycle rack, and comprises a first clamp, a second clamp and a shaft. The shaft is connected between the first clamp and the second clamp. The first clamp is secured to an upright frame of a bicycle rack, and the second clamp is used to clamp a bicycle top tube or seat tube.

The first clamp includes a first part and a second part which is pivotably connected to the first part by a pivot. The first part includes a first passage defined through the first end thereof, and the second part includes a second passage defined through the first end thereof. The pivot extends through the first and second passages to pivotably connect the first part to the second part. The first part is pivotable about the pivot so that the second end of the first part is moved relative to the second end of the second part. The second part includes a bore, and the shaft has the first end thereof connected to the bore of the second part. The second end of the shaft is connected to the second clamp. The first part includes a first recess formed to the inside thereof which faces the inside of the second part. The second part includes a second recess formed to the inside thereof. The first recess and the second recess form a restraining hole when the second end of the first part moves toward the second end of the second part so as to hold the upright frame of the bicycle rack in the restraining hole. The second part includes two lugs, and a locking member includes a tubular portion formed to the first end thereof. The tubular portion of the locking member is pivotably connected between the two lugs by a pin. The locking member further includes a protrusion formed to the second end thereof. The first part includes a notch formed to the outside of the second end thereof. The protrusion of the locking member is removably engaged with the notch to prevent the first part from being pivoted away from the second part.

Preferably, when the locking member is pivoted and away from the first part, the second end of the first part is removed from the second part so as to position the upright frame of the bicycle rack between the first and second parts. When the locking member is pivoted toward the first part and engages the protrusion of the locking member with the recess of the first part, the first and second parts restrain the upright frame of the bicycle rack in the restraining hole.

Preferably, the locking member includes a lever extending from the second end thereof.

The primary object of the present invention is to provide a clamping device for a bicycle rack, wherein the first clamp includes a first part and a second part which is pivotably connected to the first part by a pivot. A locking member restrains the first part from moving away from the second part when the locking is in a locked status. When the locking member is in an opened status, the first part moves away from the second part easily so as to position the upright frame of the bicycle rack between the first and second parts.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
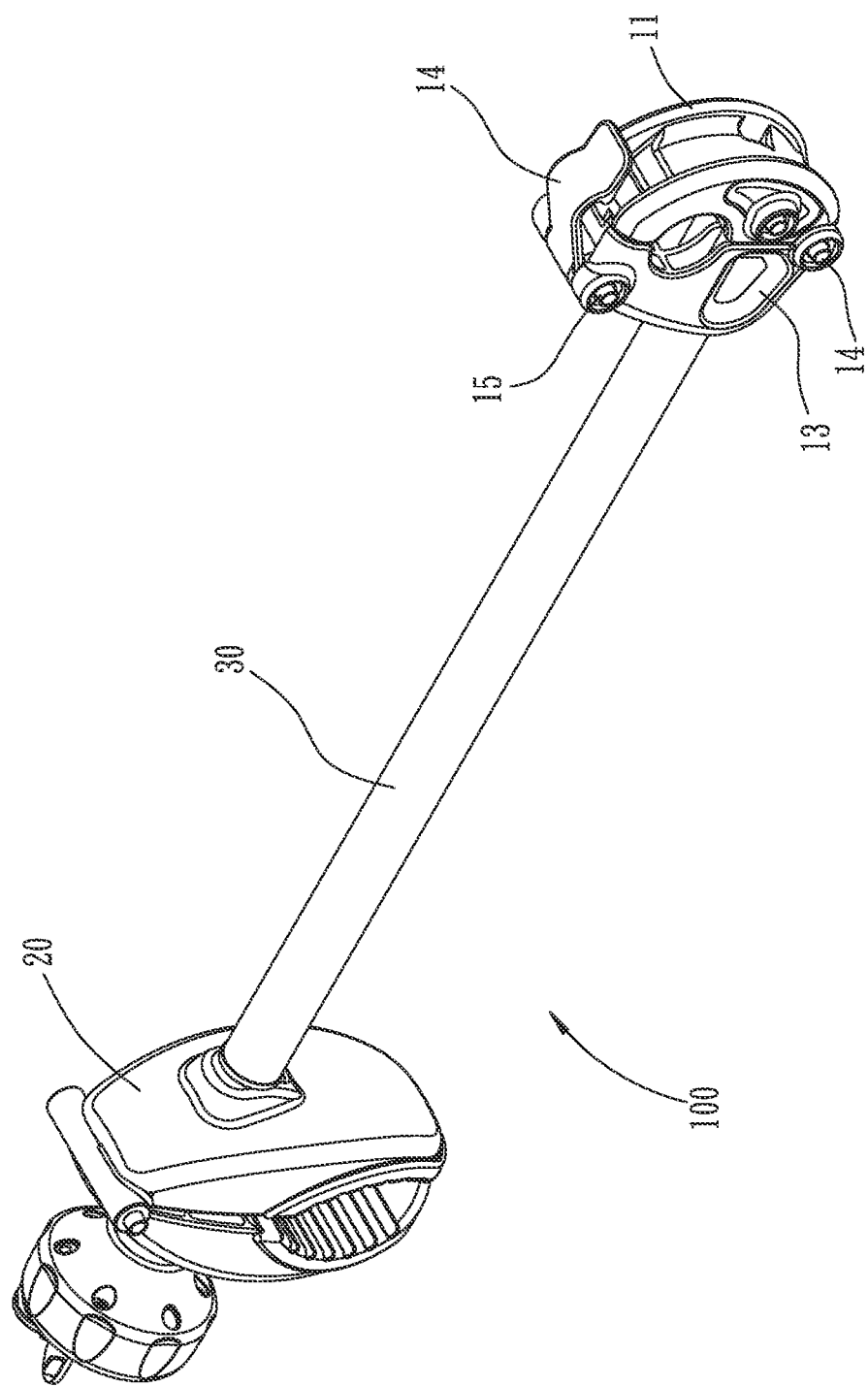
FIG. 1 is a perspective view to show the shaft with the first clamp and the second clamp of the clamping device of the present invention.
Figure 8:
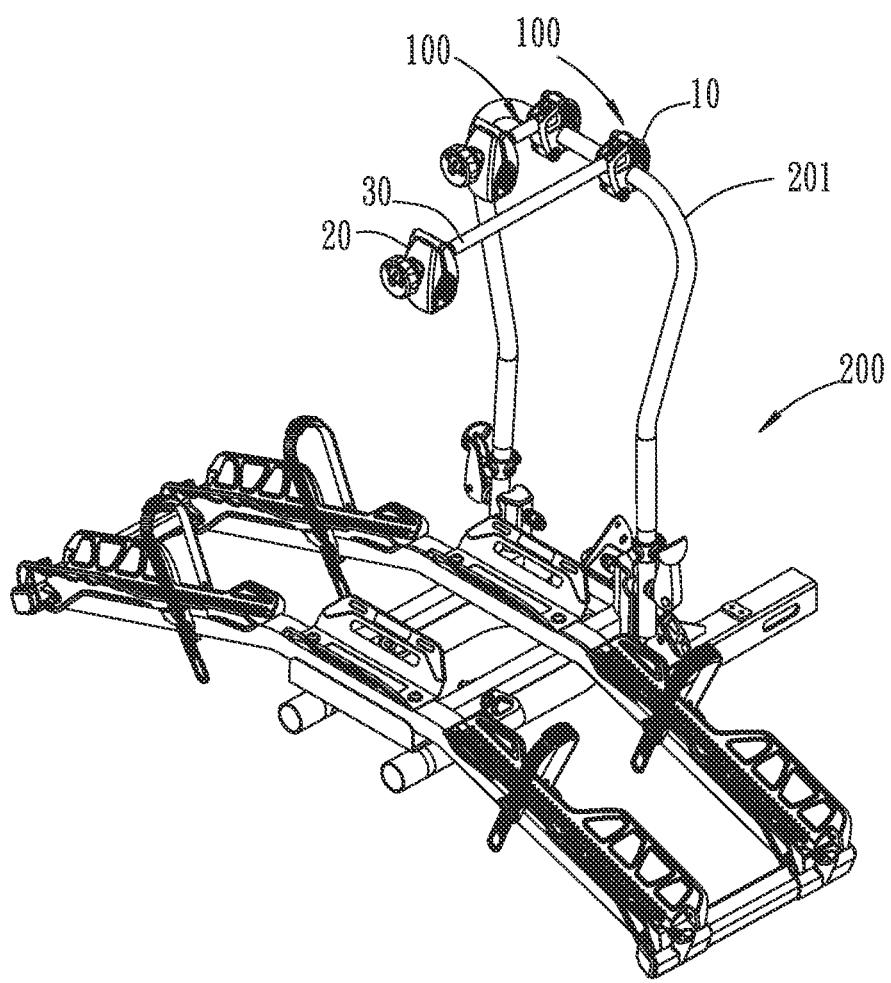
FIG. 8 shows the clamping device is used with a bicycle rack.

Referring to FIGS. 1 and 8, the clamping device 100 for a bicycle rack of the present invention comprises a first clamp 10, a second clamp 20 and a shaft 30. The shaft 30 is connected between the first clamp 10 and the second clamp 20. The first clamp 20 is to be secured to an upright frame 201 of a bicycle rack 200 as shown in FIG. 8, and the second clamp 20 is used to clamp a bicycle top tube or seat tube (not shown).

Figure 2A:
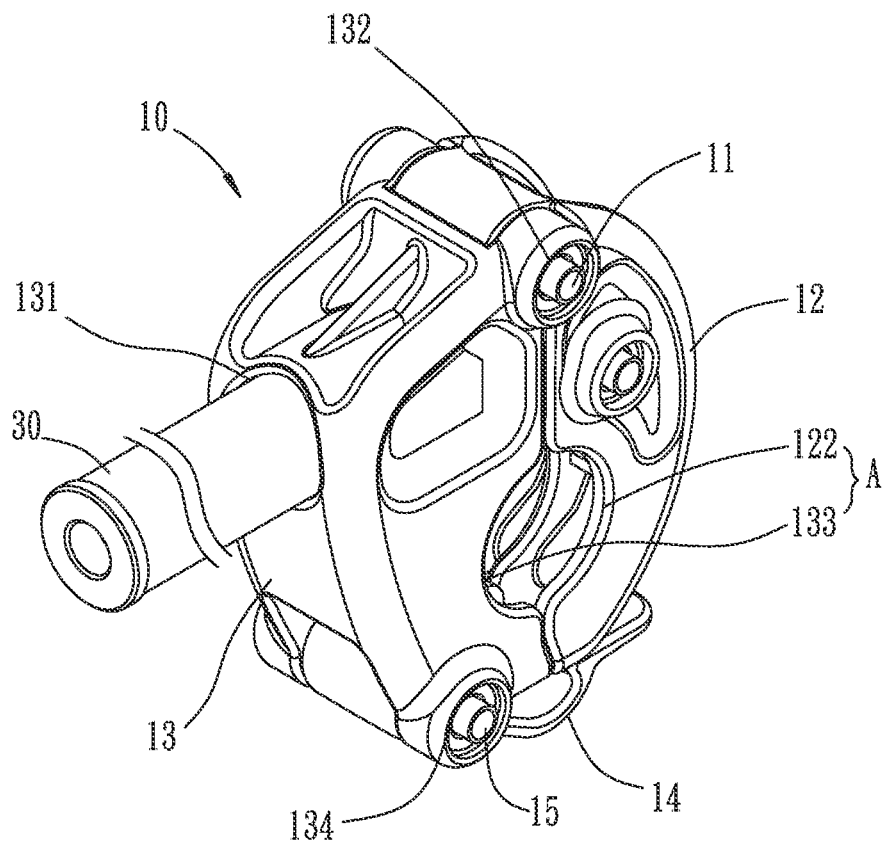
FIG. 2A shows the first clamp wherein the locking member is in a locked status.
Figure 2B:
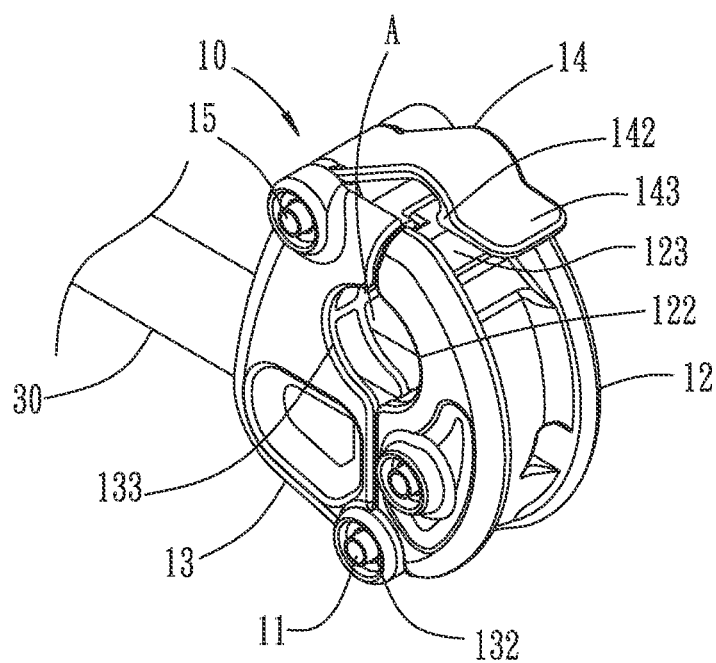
FIG. 2B illustrates another angle of view of the first clamp disclosed in FIG. 2A.
Figure 3:
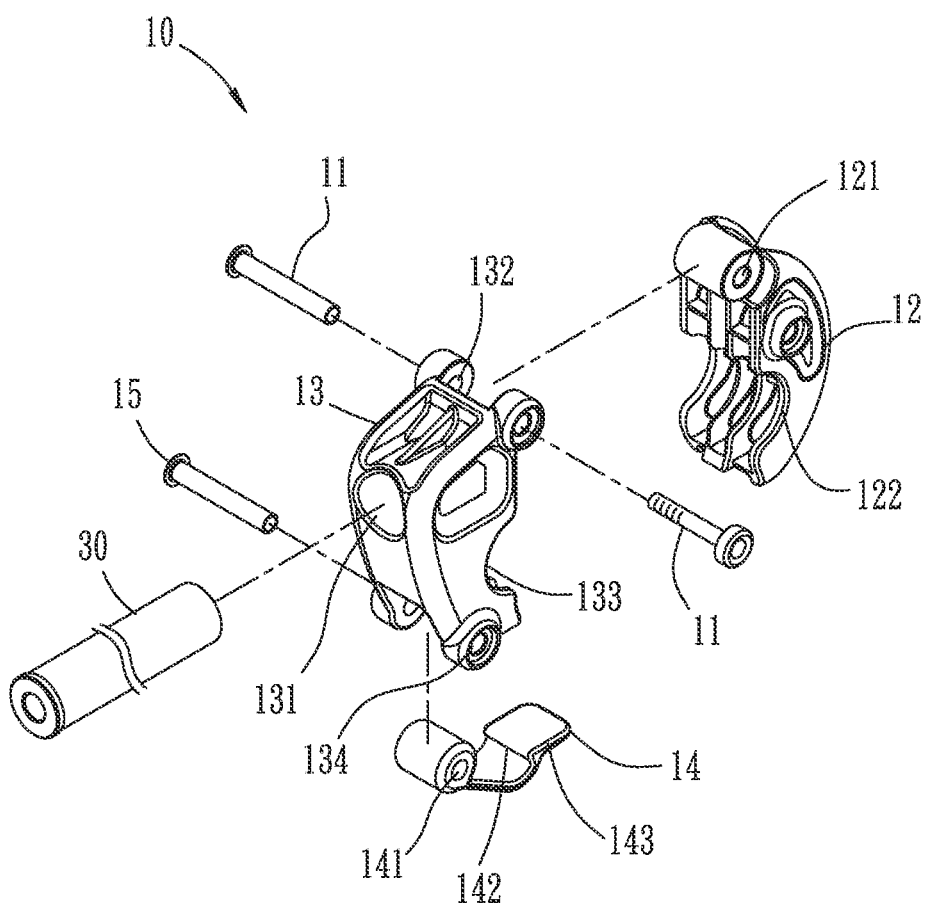
FIG. 3 is an exploded view of the first clamp of the present invention.
Figure 4:
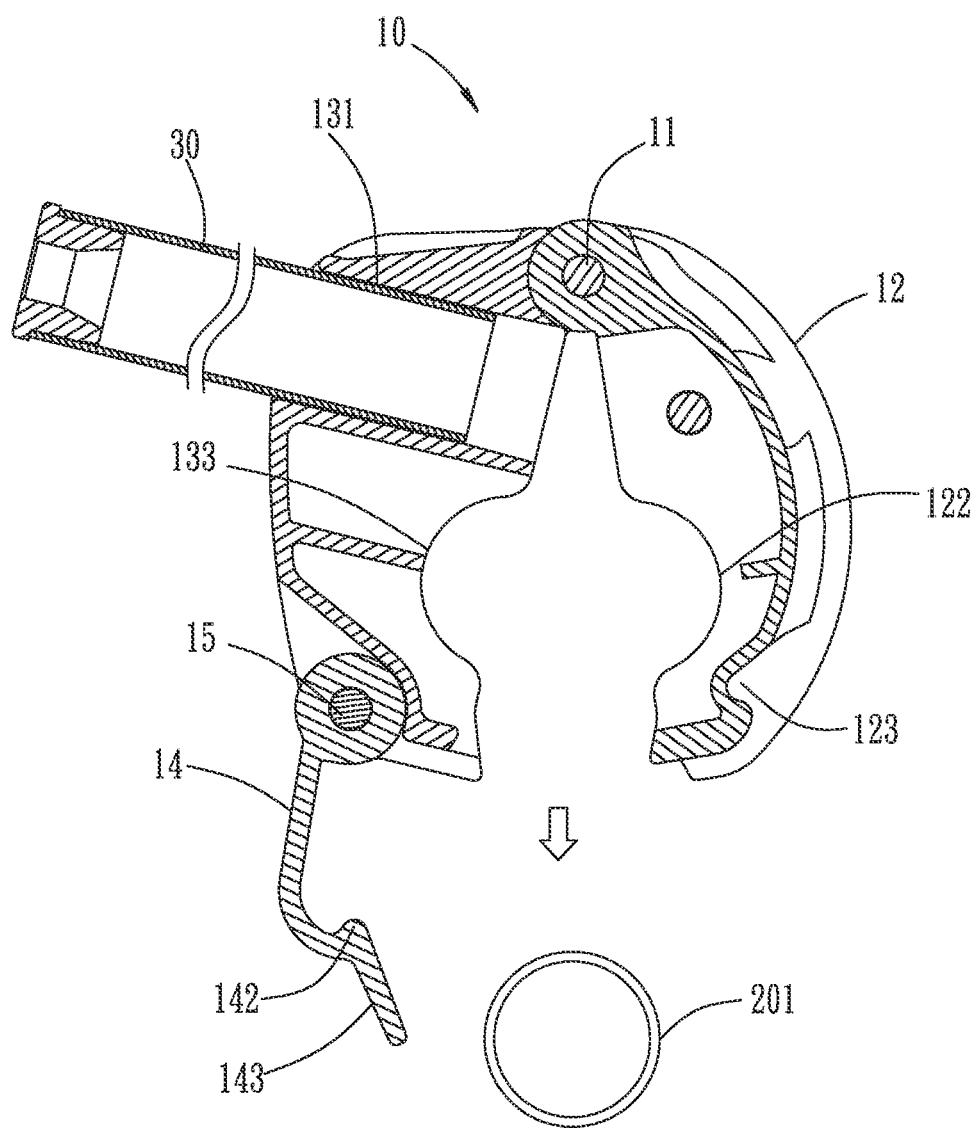
FIG. 4 is a cross sectional view to show that the locking member is in the opened status.
Figure 5:
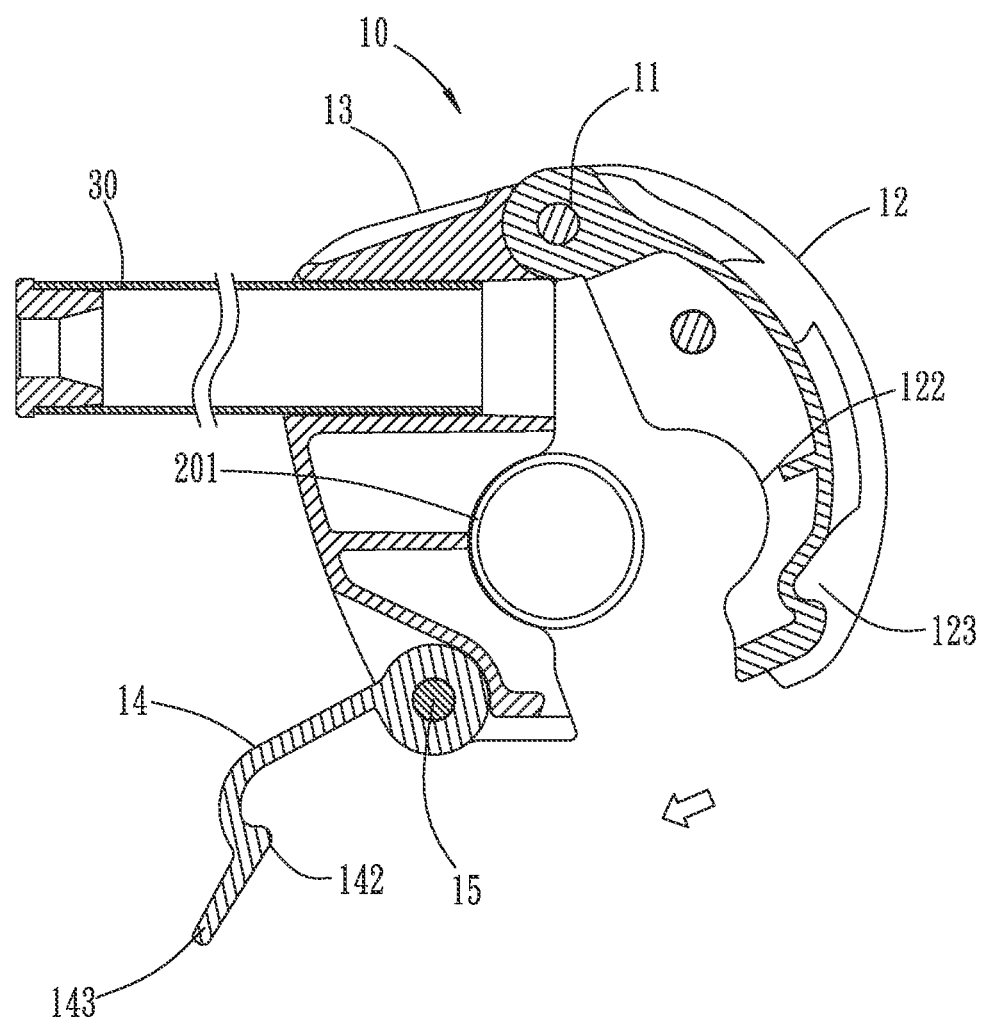
FIG. 5 is a cross sectional view to show that the locking member is in the opened status, and the upright frame is located between the first part and the second part, the first part is to be pivoted toward the second part.
Figure 6:
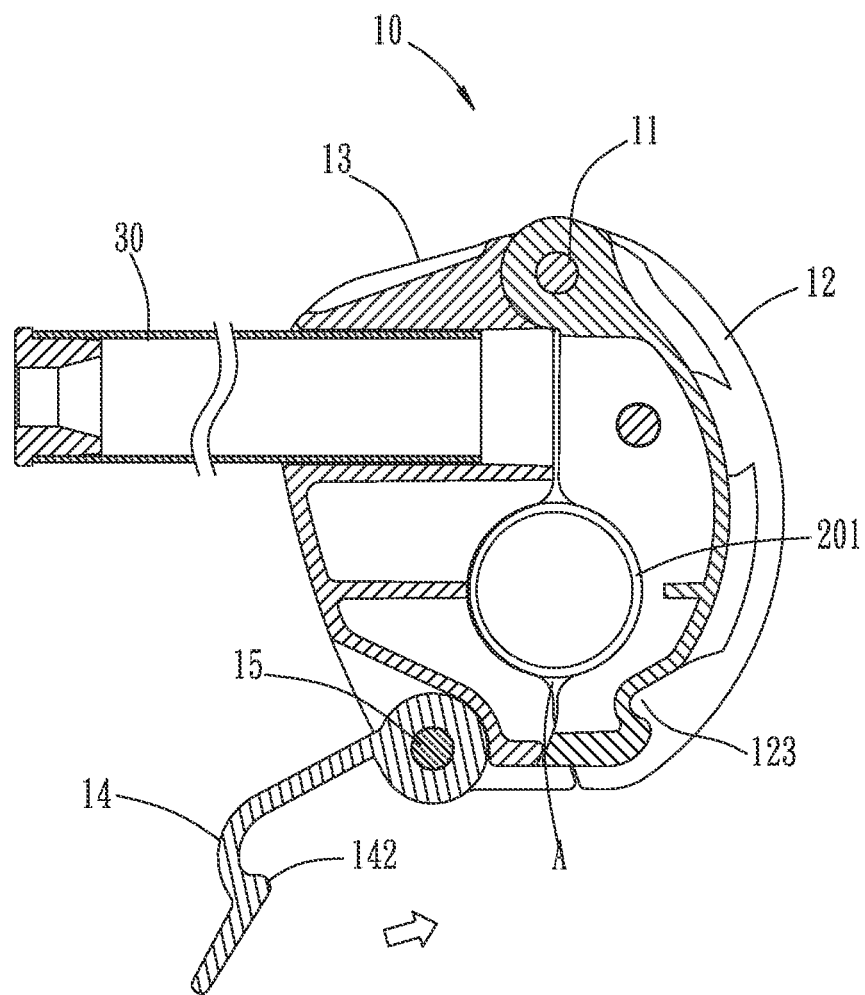
FIG. 6 is a cross sectional view to show that the first part moves to contact the second part, and the locking member is to be pivoted to its locked status, and the upright frame is located in the restraining hole between the first part and the second part.
Figure 7:
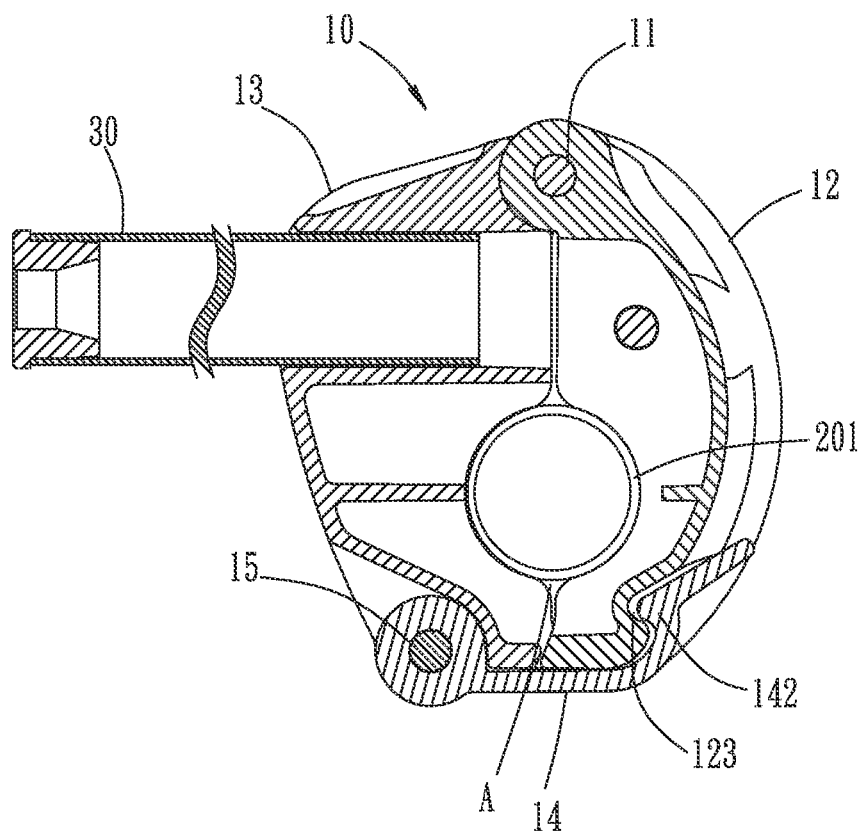
FIG. 7 is a cross sectional view to show that the first part moves to contact the second part, and the locking member is in the locked status, and the upright frame is located in the restraining hole between the first part and the second part.

As shown in FIGS. 2A, 2B and 3, the first clamp 10 includes a pivot 11, a first part 12, a second part 13 and a locking member 14. The first part 12 is a C-shaped part and includes a first passage 121 defined through the first end thereof. The second part 13 is a C-shaped part and includes a second passage 132 defined through the first end thereof. The pivot 11 extends through the first and second passages 121, 132 to pivotably connect the first part 12 to the second part 13. The first part 12 is pivotable about the pivot 11 so that the second end of the first part 12 is moved relative to the second end of the second part 13. The second part 13 includes a bore 13, and the shaft 30 has the first end thereof connected to the bore 13 of the second part 13, and the second end of the shaft 30 is connected to the second clamp 20.

The first part 12 includes a first recess 122 formed to the inside thereof which faces the inside of the second part 13. The second part 13 includes a second recess 133 formed to the inside thereof. The first recess 122 and the second recess 133 form a restraining hole "A" when the second end of the first part 12 moves toward the second end of the second part 13 so as to hold the upright frame 201 of the bicycle rack 200 in the restraining hole "A".

The second part 13 includes two lugs 134 on the second end thereof, and the locking member 14 includes a tubular portion 141 formed to the first end thereof. The tubular portion 141 of the locking member 14 is pivotably connected between the two lugs 134 by a pin 15. The locking member 14 includes a protrusion 142 formed to the second end thereof and the protrusion 142 faces the first and second parts 12, 13. A lever 143 extends from the second end of the locking member 14 so that the users can easily lift the locking member 14 by lifting the lever 143. The first part 12 includes a notch 123 formed to the outside of the second end thereof. When the second end of the first part 12 is in contact with the second end of the second part 13 as shown in FIGS. 2A and 2B, the locking member is pivoted toward the first part 12 and the protrusion 142 of the locking member 14 is removably engaged with the notch 123 to form the locked status of the locking member 14, so as to prevent the first part 12 from being pivoted away from the second part 13.

As shown in FIGS. 4 to 7, when the locking member 14 is pivoted and away from the first part 12 to its opened status, the second end of the first part 12 is removed from the second part 13, such that the upright frame 201 of the bicycle rack 200 can be positioned between the first and second parts 12, 13. When the locking member 14 is pivoted toward the first part 12 and engages the protrusion 142 of the locking member 14 with the recess 123 of the first part 12, the first and second parts 12, 13 restrain the upright frame 201 of the bicycle rack 200 in the restraining hole "A".

The advantages of the present invention are that the opening between the first and second parts 12, 13 is able to accommodate the upright frame 201 of the bicycle rack 200 of different sizes. The locking member 14 is easily to be locked and opened without use of any bolt and tool.

While we have shown and described the embodiment in accordance with the present invention, it should be clear to those skilled in the art that further embodiments may be made without departing from the scope of the present invention.

What is claimed is:

1. A clamping device for a bicycle rack, comprising:
a first clamp, a second clamp and a shaft, the shaft connected between the first clamp and the second clamp, the first clamp adapted to be secured to an upright frame of a bicycle rack, the second clamp adapted to clamp a bicycle top tube or seat tube;
wherein the first clamp includes a pivot, a first part, a second part and a locking member, the first part includes a first passage defined through a first end thereof, the second part includes a second passage defined through a first end thereof, the pivot extends through the first and second passages to pivotably connect the first part to the second part, the first part is pivotable about the pivot so that a second end of the first part is moved relative to a second end of the second part, the second part includes a bore, the shaft has a first end thereof connected to the bore of the second part, a second end of the shaft is connected to the second clamp, the first part includes a first recess formed to an inside thereof which faces an inside of the second part, the second part includes a second recess formed to the inside thereof, the first recess and the second recess form a restraining hole when the second end of the first part moves toward the second end of the second part, the second part includes two lugs, the locking member includes a tubular portion formed to a first end thereof, the tubular portion of the locking member is pivotably connected between the two lugs by a pin, the locking member includes a protrusion formed to a second end thereof, the first part includes a notch formed to an outside of the second end thereof, the protrusion of the locking member is removably engaged with the notch to prevent the first part from being pivoted away from the second part.

2. The clamping device for a bicycle rack as claimed in claim 1, wherein when the locking member is pivoted and away from the first part, the second end of the first part is removed from the second part so as to position the upright frame of the bicycle rack between the first and second parts, when the locking member is pivoted toward the first part and engages the protrusion of the locking member with the recess of the first part, the first and second parts adapted to restrain the upright frame of the bicycle rack 200 in the restraining hole.

3. The clamping device for a bicycle rack as claimed in claim 1, wherein the locking member includes a lever extending from the second end thereof.

* * * * *